(12) United States Patent
Hattis

(10) Patent No.: US 7,734,440 B2
(45) Date of Patent: Jun. 8, 2010

(54) ON-CHIP OVER-TEMPERATURE DETECTION

(75) Inventor: James Matthew Hattis, Saint Louis Park, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 11/982,263

(22) Filed: Oct. 31, 2007

(65) Prior Publication Data

US 2009/0112503 A1 Apr. 30, 2009

(51) Int. Cl.
*G01K 17/18* (2006.01)

(52) U.S. Cl. .......................... 702/99; 702/57; 702/104; 702/107

(58) Field of Classification Search ............... 702/99, 702/100, 104, 106, 130, 132, 182, 183; 323/313; 374/141; 257/467
See application file for complete search history.

(56) References Cited

U.S. PATENT DOCUMENTS

| | | | | |
|---|---|---|---|---|
| 5,336,943 A | * | 8/1994 | Kelly et al. | 327/513 |
| 5,886,515 A | * | 3/1999 | Kelly | 323/313 |
| 6,144,085 A | * | 11/2000 | Barker | 257/467 |
| 7,187,053 B2 | * | 3/2007 | Boerstler et al. | 257/467 |
| 7,356,426 B2 | * | 4/2008 | Jain et al. | 702/99 |

* cited by examiner

*Primary Examiner*—Carol S Tsai
*Assistant Examiner*—Felix E Suarez

(57) ABSTRACT

An improved method and apparatus for setting a trip-point temperature value for detection of an over-temperature condition in a chip when a reading from a main temperature sensor exceeds the trip-point temperature value. In one embodiment, the trip-point temperature value is set to a known temperature limit value offset by a temperature difference, $\Delta T$. $\Delta T$ is calculated by taking the difference between a reading of the main temperature sensor and a reading of another temperature sensor, remote from the main temperature sensor, while a heat-generating circuit is enabled. The main temperature sensor is distal from heat-generating circuit on the chip and the remote temperature sensor is proximate the heat-generating circuit. For multiple heat-generating circuits on the chip, a $\Delta T$ is determined for each of the heat-generating circuits, and the largest $\Delta T$ is used to calculate the trip-point temperature value. Advantageously, the largest $\Delta T$ determination may be done only once.

16 Claims, 2 Drawing Sheets

ON-CHIP OVER-TEMPERATURE DETECTION

TECHNICAL FIELD

The present invention relates to integrated circuits, and, in particular, to integrated circuit over-temperature detection techniques or the like.

BACKGROUND

The operational lifetime of an integrated circuit (a "chip") is directly related to the operating temperature of the chip. Should any portion of the chip reach an over-temperature condition (where the portion of the chip exceeds a known temperature limit which may be as high as a temperature above which the chip will be irreversibly damaged), that portion the chip might fail for a variety of reasons, such as electromigration-induced failure of metal conductors on the chip. To protect the chip from overheating, a thermal protection circuit may be provided that disables or shuts down various circuits on the chip to reduce power consumption thereof. The thermal protection circuit is triggered when the temperature of the chip exceeds a trip-point temperature. Generally, the trip-point temperature is less than the known temperature limit which is less than the irreversible damage temperature.

A typical thermal protection circuit comprises an on-chip temperature sensor. But because the on-chip temperature sensor is typically much smaller than the chip as a whole, the temperature sensor might be located in an area of the chip that is colder than other areas of the chip. This could lead to premature chip failure notwithstanding the use of a thermal protection circuit. For example, even though a thermal protection circuit that has a trip-point temperature equal to the known temperature limit but does not detect an over-temperature condition, because the temperature sensor could be in a "cold" part of the chip, there might be portions of the chip significantly hotter than the known temperature limit and the life of the chip is thereby shortened.

Because of the uncertainty of where and what the highest temperature is on the chip at any given time, the trip-point temperature value is set significantly lower than the known temperature limit. To guarantee that no portion of the chip, regardless of where and how it is used, exceeds the known temperature limit, the trip-point temperature is typically set so low that the chip will shut down well before any part of the chip reaches the known temperature limit, effectively reducing the operating temperature range of the chip.

SUMMARY

In one embodiment, the present invention is a method of setting a trip-point temperature value for an over-temperature detector responsive to a main temperature sensor located in an integrated circuit, the method comprising the steps of: enabling at least one heat generating circuit on an integrated circuit; reading at least one remote temperature sensor in the integrated circuit that is proximate the at least one heat generating circuit; reading the main temperature sensor; calculating a temperature difference, $\Delta T$, between the main temperature sensor reading and the remote temperature reading; and setting the trip-point temperature value to a known temperature limit value offset by the $\Delta T$. The main temperature sensor is distal from the heat generating circuit.

In still another embodiment, the present invention is an integrated circuit comprising at least one heat generating circuit; at least one remote temperature sensor proximate the at least one heat generating circuit; a main temperature sensor distal from the heat generating circuit; a processor adapted to 1) read the remote temperature sensor and the main temperature sensor while the at least one heat generating circuit is enabled, 2) calculate a temperature difference, $\Delta T$, between the main temperature sensor reading and the remote temperature sensor reading, and 3) calculate a trip-point temperature value, for use by an over-temperature detector responsive to the main temperature detector, substantially equal to a known temperature limit value offset by the $\Delta T$.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION

Figure 1:
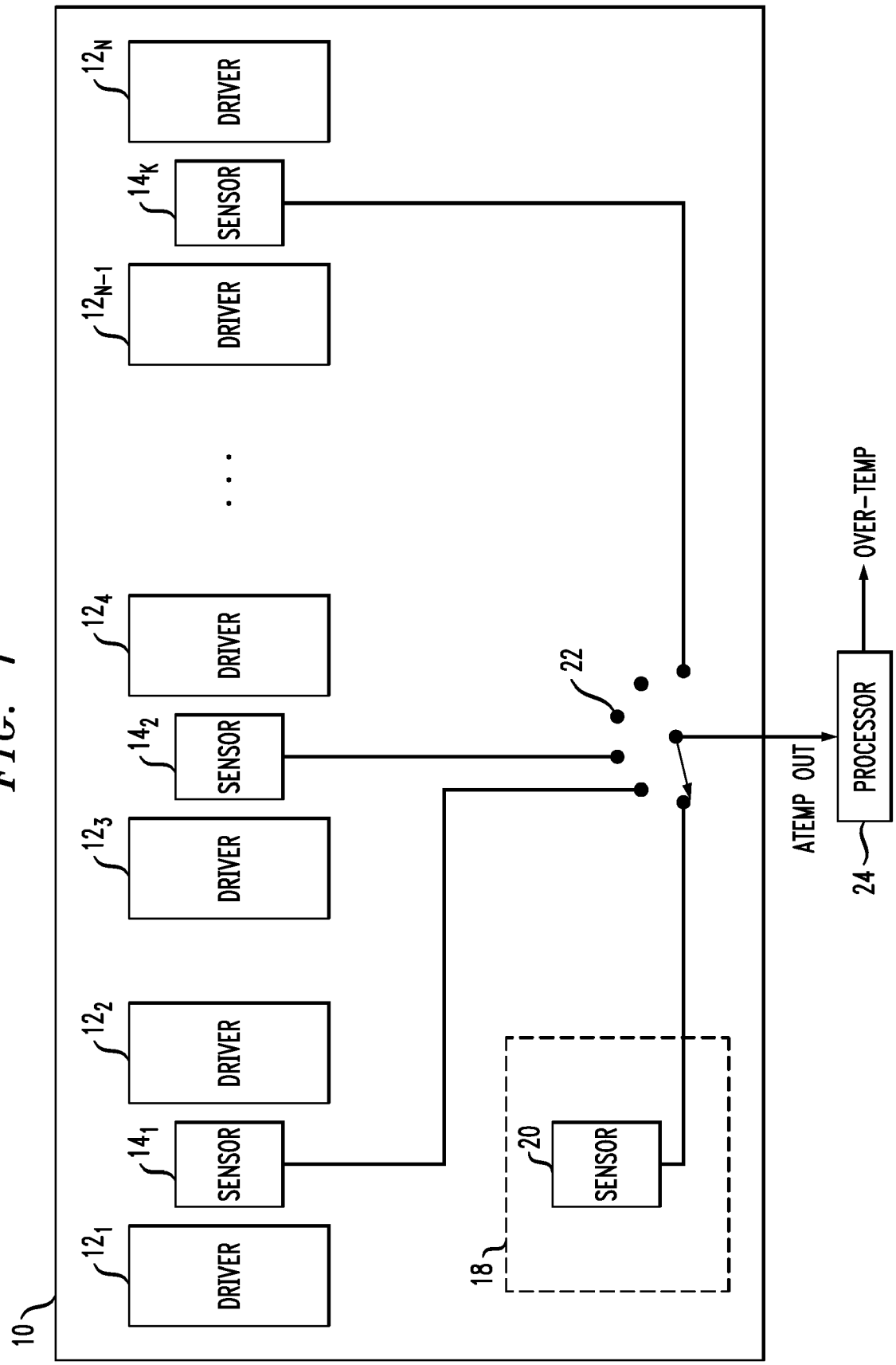
FIG. 1 is a simplified block diagram of an exemplary preamplifier chip used in hard drive disk systems.

Referring to FIG. 1, an exemplary embodiment of the invention is shown, in which a simplified block diagram of an exemplary preamplifier chip 10 for use in a hard drive disk system. The chip 10 has N heat generating driver circuits $12_1$-$12_N$ (also referred to collectively as heat generating circuits or drivers 12) used to drive write signals to write heads (not shown) in a disk system. Typical diver circuits dissipate a lot of power compared to other circuits on the chip 10. Disposed between adjacent diver pairs, e.g., drivers $12_1$ and $12_2$, $12_3$ and $12_4$, etc., are temperature sensors $14_1$-$14_K$ (also referred to collectively as sensors 14). The temperature sensors 14 are proximate the divers $12_1$-$12_N$ and provide relatively accurate reading of the temperature of the drivers 12. Also included on the chip 10 is other circuitry 18, such as bias circuits and control circuits, which dissipate relatively small amounts of power. Imbedded in the circuitry 18 is a main temperature sensor 20 distal from the drivers $12_1$-$12_N$. Readings from the temperature sensors 14 (also referred to herein as "remote" temperature sensors 14 since they are "remote" from the main sensor 20), and the main sensor 20 are taken by appropriately configuring an analog multiplexer 22 (shown here as a multi-position switch), under control of a processor or the like (not shown) to couple the sensors 14 and 20 to a processor 24 (in this example, a processor with an analog-to-digital converter). The processor 24 "reads" the sensors 14, 20 by converting the analog signal at the output, ATEMP, of the multiplexer 22 into a temperature value (e.g., in degrees Celsius). Alternatively, the chip 10 may have therein an analog-to-digital converter and the output signal from the chip 10 is in digital form.

As will be discussed in more detail below, the processor 24 may also process readings from the main temperature sensor 20 to generate an over-temperature alarm (OVER-TEMP) and/or shut down circuits on the chip 10 should the temperature of the chip 10, as measured by the main sensor 20, exceed a trip-point temperature.

Briefly, because the main temperature sensor 20 is further away from the heat generating drivers 12 than the remote sensors 14, the temperature readings from the main sensor 20 might be significantly different from the temperature readings from the remote sensors 14. Ignoring any differences in electrical characteristics between the sensors 14, 20 due to design or manufacturing variations (as will be explained in more detail below), because of the finite thermal conductivity of the semiconductor material used to make the chip 10 (e.g., silicon) and the substrate to which chip 10 is attached (e.g., an epoxy bond of chip 10 to a metal heatsink), heat generated by an active one or more of the drivers 12 will remain localized to the active driver and the surrounding area and not completely reach sensor 20. Thus, a temperature reading from the sensor 20 might be lower than the actual temperature of an active driver 12. For example, a reading from the remote sensor $14_2$ most proximate the driver $12_3$ will be a better indication of the temperature of the driver $12_3$ than a temperature reading from the main sensor 20. However, for a variety of reasons, it may not be convenient to take readings from each of the remote sensors 14 during operation of the chip 10 but instead take chip temperature measurements from the main sensor 20 alone to determine the highest temperature within the chip 10. It is therefore desirable that, when analyzing the readings from the main sensor 20, the differences in temperature across the chip 10 are taken into consideration. To do so, a temperature-offset is calculated using measured temperature differences across the chip. Calculation of the temperature differences and the resulting temperature offset (done within processor 24 in this example) is illustrated in FIG. 2.

Figure 2:
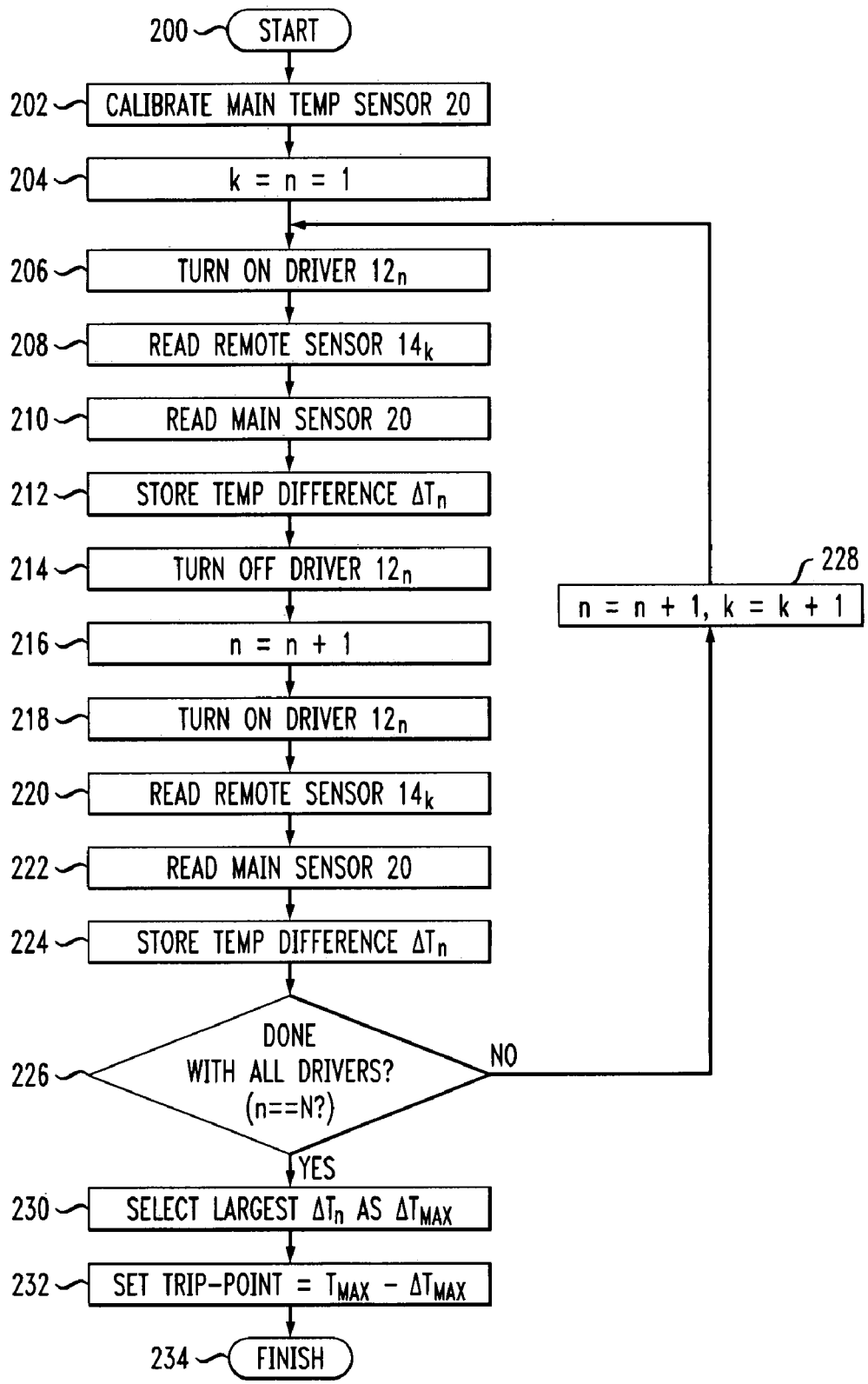
FIG. 2 is a simplified, high-level flow chart illustrating a process for determining temperature differences across the chip of FIG. 1 for different chip configurations, and for setting a trip-point temperature value while taking into account the temperature differences.

Exemplary process steps 200-234 illustrated in FIG. 2 disclose a simplified process for determining temperature differences across the chip 10 of FIG. 1 for different operating configurations of the drivers 12, and for setting a trip-point temperature value (used to generate an alarm and/or shut down the chip 10) while taking into account the temperature differences. For purposes of this exemplary process and as explained above, there is one remote sensor $14_k$ for every two drivers $12_n$ ($1 \leq k \leq K$, $1 \leq n \leq N$; $K=N/2$). However, the ratio between the sensors 14 to drivers 12 (or other heat-generating circuitry) may be different from the illustrative 1:2.

In step 202, the chip 10 (FIG. 1) is placed on a chuck or other controlled temperature environment and the main temperature sensor 20 (FIG. 1) is calibrated with all of the drivers 12 off. Because the temperature sensors 14 and 20 have, in this example, substantially identical electrical characteristics, there is no need to calibrate the remote sensors 14. However, if the main sensor 20 and the remote sensors 14 are of a different design, then at least one of the remote sensors 14 may need to be calibrated along with sensor 20. It is understood that the calibration step 202 may be done just once, either during a test after manufacture thereof or when the chip is packaged/mounted. The steps 204-234 may be repeated as needed, depending on the final application of the chip 10, e.g., during manufacture of the equipment in which the chip 10 is installed.

Step 204 initializes variables used in a loop comprising steps 206-228. In steps 206-228, all of the drivers 12 are individually and sequentially turned on (enabled) and the temperature as measured by the sensor $14_k$, closest to the enabled driver $12_n$, and the main sensor 20 are read. The difference in temperature, $\Delta T_n$, is calculated as the difference between the two temperature readings. For example, one heat generating circuit, e.g., driver $12_3$ (n=3), is turned on and the temperatures from sensor $14_2$ (k=2) and sensor 20 are read, the difference being $\Delta T_3$. Then driver $12_3$ is turned off, driver $12_4$ turned on, and the temperatures read from sensor $14_2$ and sensor 20, the temperature difference being $\Delta T_4$.

After all the $\Delta T_n$ values are calculated, the largest of the $\Delta T_n$ ($1 \leq n \leq N$) values is selected as the temperature-offset value, $\Delta T_{MAX}$, in step 230. Then in step 232 the trip-point temperature value is set to the known temperature limit value of the chip, $T_{MAX}$, offset by the $\Delta T_{MAX}$. The trip-point temperature value may then used by the processor 24 and/or a thermal protection circuit (not shown), responsive to the ATEMP signal, to shutdown the heat generating circuits (drivers) 12 in the chip 10 and/or generate an alarm signal (OVER-TEMP) when the temperature read from the main temperature sensor 20 exceeds the trip-point temperature value. In this embodiment, the same result can be obtained by offsetting the readings from the sensor 20 with the temperature-offset value, $\Delta T_{MAX}$, and leaving the known temperature limit value unchanged. Because the trip-point temperature value is set in response to the measured temperature differences across the chip, the resulting trip-point temperature value will likely be higher (and more accurate) than a trip-point temperature value resulting from prior techniques. This allows a greater chip operating temperature range than with prior art techniques without shortening the operational lifetime of the chip.

The temperature sensors 14, 20 preferably have substantially identical electrical characteristics (made possible by all the sensors 14, 20 being of substantially identical design and the inherent uniformity of circuit components across the chip 10) such that, if the chip 10 has a uniform temperature, then the readings from the sensors 14, 20 will be substantially the same. The sensors 14, 20 may be of a conventional design, such as a forward-biased diode, a resistor with a known temperature characteristic (e.g., an implanted resistor), or a current source that produces a current proportional to absolute temperature (e.g., a PTAT current source) coupled to a precision resistor to produce an output voltage that is proportional to absolute temperature. Advantageously, the PTAT current source/precision resistor approach allows for accurate temperature readings as well as the ability to share the precision resistor (not shown) among the temperature sensors 14, 20 via multiplexer 22.

It is understood that while the embodiment shown herein is a hard-disk head preamplifier chip, the invention may be used in other applications where the temperature of certain areas on a chip can be significantly different from other areas and an accurate estimation of the highest temperature on the chip is needed based on a small number of temperature measurements, e.g., in microprocessors, ASICs, etc.

Advantageously, all of the circuitry of the preamplifier chip 10 may be implemented in one mixed-signal integrated circuit. Further, the thermal protection circuit (not shown) and/or other various processors, including processor 24, may be implemented on the chip 10.

Although the present invention has been described in the context of a hard-disk head preamplifier chip, those skilled in the art will understand that the present invention can be implemented in the context of other types of storage systems and other kinds of chips.

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable. Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method of setting a trip-point temperature value for an over-temperature detector responsive to a main temperature sensor located in an integrated circuit comprising a plurality of heat generating circuits and a plurality of remote temperature sensors, the method comprising the steps of:
   a) enabling one of the plurality of heat generating circuits;
   b) reading at least one of the remote temperature sensors proximate the enabled heat generating circuit;
   c) reading the main temperature sensor;
   d) calculating a temperature difference, $\Delta T$, between the main temperature sensor reading and the remote temperature sensor reading;
   e) disabling, after step d), the one heat generating circuit enabled in step a);
   f) executing steps a)-e) for each of the plurality of heat generating circuits;
   g) determining the largest $\Delta T$ calculated in step e); and
   h) setting the trip-point temperature value to a known temperature limit value offset by the largest $\Delta T$;
   wherein the main temperature sensor is distal from the plurality of heat generating circuits, and wherein only one heat generating circuit at a time is enabled in step a), and wherein the plurality of heat generating circuits, the plurality of remote temperature sensors, and the main temperature sensor are located in one mixed-signal integrated circuit.

2. The method of claim 1, wherein there is one remote temperature sensor for every two heat generating circuits, each remote temperature sensor being disposed between two adjacent heat generating circuits.

3. The method of claim 1, further comprising the step of:
   calibrating the main temperature sensor prior to step a).

4. The method of claim 3, wherein the step of calibrating the main temperature sensor comprises the steps of:
   disabling the heat generating circuit; and
   heating the integrated circuit to a known temperature.

5. The method of claim 1, wherein the main and remote temperature sensors have substantially the same electrical characteristics.

6. The method of claim 1, wherein the known temperature limit value is a temperature above which the integrated circuit will be damaged.

7. The method of claim 1, further comprising the step of:
   multiplexing signals from the remote and main temperature sensors to a processor;
   wherein the processor, responsive to the multiplexed signals, is adapted to read each of the temperature sensors in steps b) and c).

8. The method of claim 1, further comprising the steps of:
   reading the main temperature sensor; and
   generating a signal when the main temperature sensor reading in step exceeds the trip-point temperature value.

9. An apparatus comprising:
   a plurality of heat generating circuits;
   a plurality of remote temperature sensors proximate the plurality of heat generating circuits;
   a main temperature sensor distal from the heat generating circuits;
   a processor adapted to:
      a) enable one of the plurality of heat generating circuits at a time,
      b) read at least one of the remote temperature sensors proximate the enabled heat generating circuit and the main temperature sensor while the one heat generating circuit is enabled,
      c) calculate a temperature difference, $\Delta T$, between the main temperature sensor reading and the remote temperature sensor reading for each enabled heat generating circuit,
      d) disable, after calculating the temperature difference, the one heat generating circuit enabled in a
      e) determine which of the calculated $\Delta T$ is the largest $\Delta T$, and
      f) calculate a trip-point temperature value, for use by an over-temperature detector responsive to the main temperature sensor, substantially equal to a known temperature limit value offset by the largest $\Delta T$;
   wherein the plurality of heat generating circuits, the plurality of remote temperature sensors, and the main temperature sensor are located in one mixed-signal integrated circuit.

10. The apparatus of claim 9, wherein the known temperature limit value is a temperature above which the integrated circuit will be damaged.

11. The apparatus of claim 9, further comprising a multiplexer coupled to the remote and main temperature sensors; wherein the multiplexer is adapted to couple signals from the temperature sensors to the processor for the processor to read each of the temperature sensors.

12. The apparatus of claim 9, wherein the processor is further adapted to read the main temperature sensor; and generate a signal when the main temperature sensor reading exceeds the trip-point temperature value.

13. The apparatus of claim 9, wherein the remote and main temperature sensors have substantially the same electrical characteristics.

14. A method of operating an integrated circuit having a plurality of heat generating circuits and a plurality of remote temperature sensors proximate the plurality of heat generating circuits, and a main temperature sensor distal from the heat generating circuits, the method comprising the steps of:
a) calibrating the main temperature sensor;
b) enabling one of the plurality of heat generating circuits;
c) reading at least one of the remote temperature sensors proximate the enabled heat generating circuit;
d) reading the main temperature sensor;
e) calculating a temperature difference, $\Delta T$, between the main temperature sensor reading and the remote temperature sensor reading;
f) disabling, after step et the one heat generating circuit enabled in step b);
g) repeating steps b)-f) for each remaining heat generating circuit;
h) determining the largest $\Delta T$ as calculated in step e); and
i) setting a trip-point temperature value to a known temperature limit value offset by the largest $\Delta T$;
j) reading the main temperature sensor; and
k) generating a signal when the main temperature sensor reading in step j) exceeds the trip-point temperature value;
wherein only one heat generating circuit at a time is enabled in step b).

15. The method of claim 14, wherein the step of calibrating the main temperature sensor comprises the steps of:
disabling the heat generating circuits; and
heating the integrated circuit to a known temperature.

16. The method of claim 14, wherein, in step i), the trip-point temperature value is approximately the known temperature limit value, and, in step k), the main temperature sensor reading is offset by the largest $\Delta T$.

* * * * *